United States Patent Office 3,099,861
Patented Aug. 6, 1963

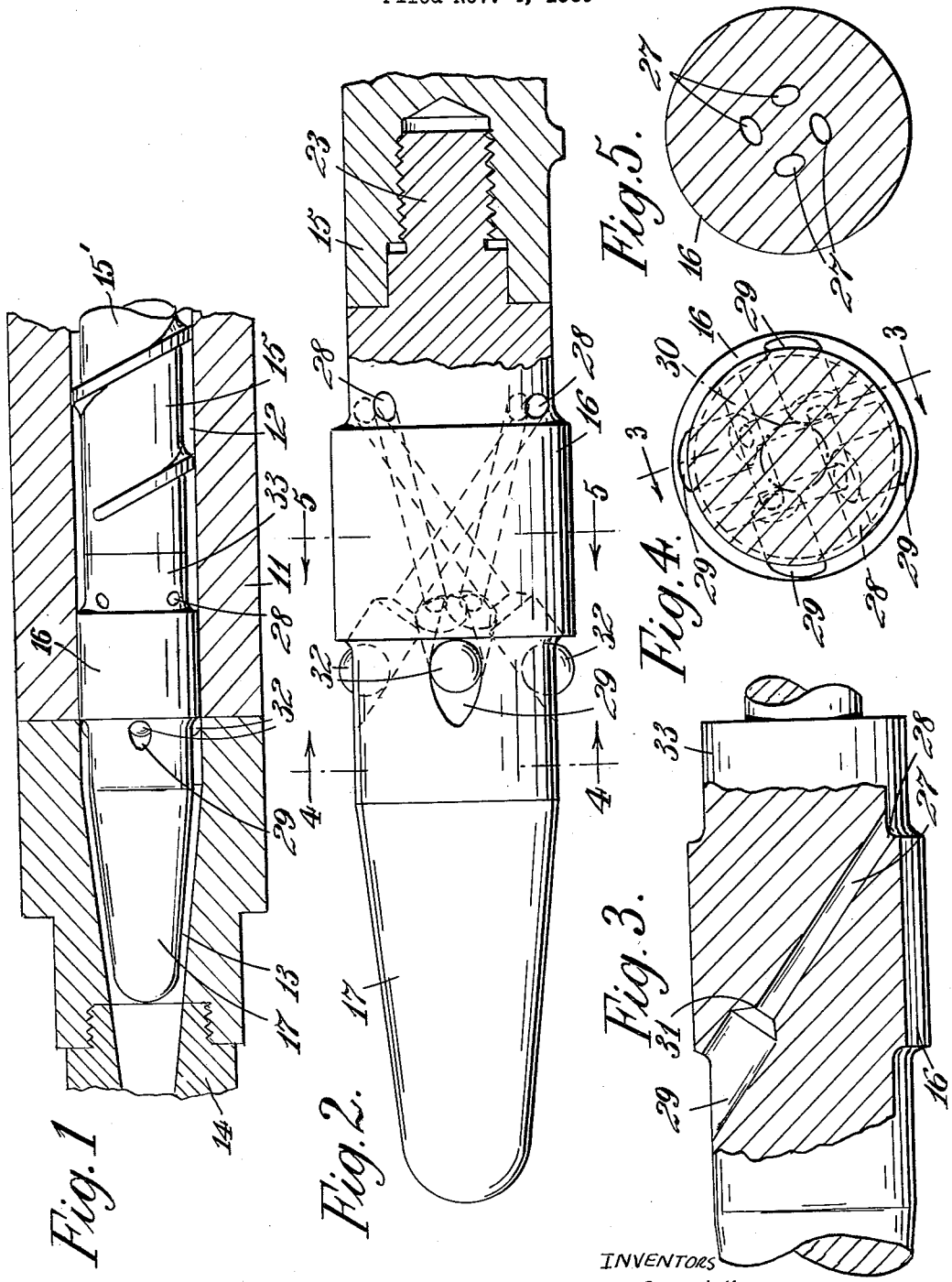

3,099,861
INJECTION MOULDING MACHINE
Emeric Gaspar, Michael George Munns, and Richard Austin Butler, London, England, assignors to The Projectile & Engineering Company Limited, London, England, a British company
Filed Nov. 4, 1960, Ser. No. 67,420
Claims priority, application Great Britain Nov. 10, 1959
3 Claims. (Cl. 18—30)

This invention relates to injection moulding machines of the kind in which plastic material is fed forward in a bore from the bore inlet to a preplasticising chamber by rotation of a feed screw and forced from the preplasticising chamber into a mould by axial movement of the feed screw. A piston head is conveniently provided at or near the end of the feed screw in or nearer the preplasticising chamber to improve transmission of force from the feed screw to the plastic material in the preplasticising chamber. This invention is concerned with such piston heads.

According to the invention in or for an injection moulding machine having a plasticising chamber with a bore provided with an inlet at one end and an outlet at the other. A feed screw is employed in the bore for moving plastic material towards the outlet, with a piston head fixed on the end of the feed screw nearest the outlet, the piston head being of such size as to fit the bore and having at least one passage through which plastic material may pass from the feed screw side of the piston head and a non-return valve controlling the passage.

Preferably the valve member is a ball which is contained within a pocket formed in the piston head and which seats upon a seat at the outlet end of the passage. When the machine is utilising fibrous plastic material, then preferably the seat of the non-return valve is formed as a knife-edge so that closing of the non-return valve tends to cut through any fibres extending across the seat.

Preferably there are a plurality of bores through the piston head, a plurality of balls and a plurality of pockets containing the balls.

Alternatively the passages may be inclined to the axis and partially tangential to the piston, in which case it is possible to obviate the need for the circumferential groove.

The following is a description by way of example of certain embodiments in accordance with the invention.

In the accompanying drawings:
FIGURE 1 is a longitudinal section through the end of a plasticising chamber containing a feed screw with a piston and passages therethrough;
FIGURE 2 is a side elevation of the piston to a larger scale;
FIGURE 3 is a longitudinal section through the piston upon the line 3—3 of FIGURE 4, looking in the direction of the arrows;
FIGURE 4 is a section upon the line 4—4 of FIGURE 2, looking in the direction of the arrows, and
FIGURE 5 is a section upon the line 5—5 of FIGURE 2, looking in the direction of the arrows.

Referring to FIGURES 1-5 of the drawing, the greater part of the plasticising chamber is broken away but must be supposed to extend to the right in the figure as far as an inlet for plastic granules, which is not shown. At the forward end of the plasticising chamber, (i.e., the left hand end in FIGURE 1), the bore 12 tapers as shown at 13 so as to become smaller and so that at the tip it receives an injection nozzle 14, only part of which appears in the drawing. Located within the bore 12 for rotational and axial movement therein is a feed screw 15. The feed screw extends through the whole length of the plasticising chamber as far as the inlet above referred to and beyond the inlet it is provided with driving means for rotating and moving it axially, which are not shown. At its forward end it is provided with a piston head 16, the operative part of which is cylindrical and is a sliding fit in the bore 12. On the cylindrical piston head there is formed a nose 17 which has approximately the same taper as the tapered part 13 of the bore of the chamber. The arrangement of the passages through the piston head 16 is such that the greater part of the flow of the plastic material is streamlined. Variation of cross-section for flow of the material is as far as possible avoided and it will be seen that pockets where material can collect without flowing are obviated. Four passages 27 through the piston head are drilled in inclined directions from inlets 28 located behind the piston head to outlet pockets 29 located in front of the piston head. The passages 27 do not pass across the axis of the piston but are tangential to an imaginary circle described around its axis as indicated in chain line at 30, FIGURE 4. Each of the passages contains a seating 31 for a ball valve and the balls are shown at 32, FIGURE 2. As can be seen from FIGURE 1 of the drawing, the balls 32 are prevented from coming out of pockets 29 by the surrounding wall of the plasticising chamber in which the piston head 16 works. The inlets 28 enter from a portion 33 of the piston head, which is of the same diameter as the shank 15' of the feed-screw 15 and thus pockets in which plastic material collects at a slower rate of flow than through the main passages are obviated. In operation, rotation of the feed screw 15 forces plastic material forward in the chamber 12 and through the passages 27. This forces the balls 32 to rise off their seating and the plastic material flows around the balls and then around the nose 17 into the space behind the nozzle 14. If the nozzle 14 is closed, as it will be if the nozzle is in contact with a mould which has been filled by a previous charge of plastic material, the effect will be that the nose 17 with the piston 16 and the feed-screw 15 is forced rearwardly, that is to say, toward the right in FIGURE 1 so that a charge of plastic material accumulates behind the nozzle. If the mould is now opened and the previous moulding removed and the mould closed again, it is then possible by forcing the feed screw with the piston 16 and the nose 17 forward, that is to the left in the figure, to force the plastic material through the nozzle into the mould. At the same time, the pressure behind the nozzle causes the balls 32 to seat on the seats 31 and prevent back-flow of plastic material through the passages 21. As the balls 32 seat on the line 31 of the seating, closing of the ball valves tends to cut through any fibres which the plastic material may carry and the balls effectively deal in this way even with fibrous plastic material.

We claim:
1. Injection moulding mechanism comprising in combination a cylindrical plasticising chamber having an inlet for granular material at one end and an outlet for plasticised material at the other end, a feed screw mounted within the chamber for rotation and reciprocation and having thereon a screw thread which fits the interior of the chamber, a piston head rigid with the feed screw which head is located near the outlet end of the chamber and is a sliding fit in the chamber, the chamber having a tapered portion adjacent its outlet end, and the feed screw between said piston head and the said outlet having a similarly tapered nose, a passage extending through the piston head from an inlet end on one axial side of the piston head in an inclined tangential direction to an outlet end on the opposite axial side of such piston head and near the base of said tapered portion, and a non-return valve in said passage at the outlet end.

2. An injection moulding mechanism as claimed in claim 1 wherein a plurality of said passages extend through the piston head, a non-return valve being operatively disposed in each said passage.

3. An injection moulding mechanism as claimed in claim 1 wherein the non-return valves consist of steel balls.

References Cited in the file of this patent

UNITED STATES PATENTS

| | | |
|---|---|---|
| 2,885,734 | Wucher | May 12, 1959 |

FOREIGN PATENTS

| | | |
|---|---|---|
| 1,144,411 | France | Apr. 23, 1957 |
| 1,168,011 | France | Aug. 25, 1958 |
| 1,190,301 | France | Mar. 31, 1959 |